Figure 1:
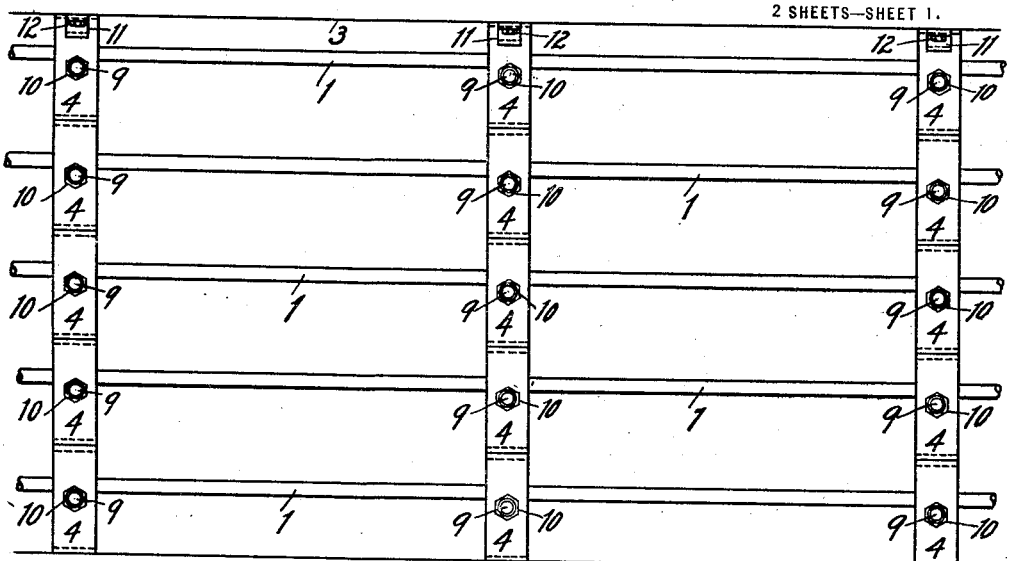

T. J. MORRIS.
SECTIONAL SUPPORT.
APPLICATION FILED FEB. 6, 1919.

1,312,861.

Patented Aug. 12, 1919.

2 SHEETS—SHEET 1.

WITNESS:

INVENTOR.
Thomas J. Morris,
BY
Frank A. Cutter,
ATTORNEY.

T. J. MORRIS.
SECTIONAL SUPPORT.
APPLICATION FILED FEB. 6, 1919.
1,312,861.
Patented Aug. 12, 1919.
2 SHEETS—SHEET 2.
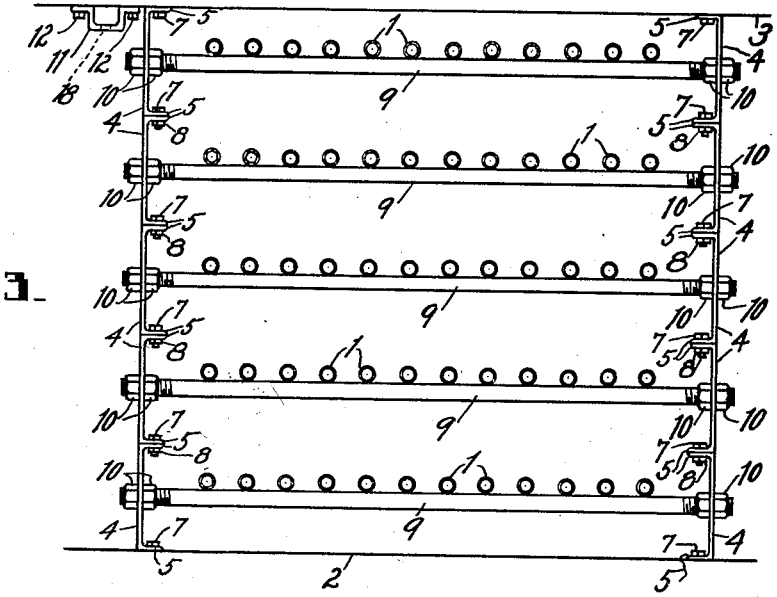
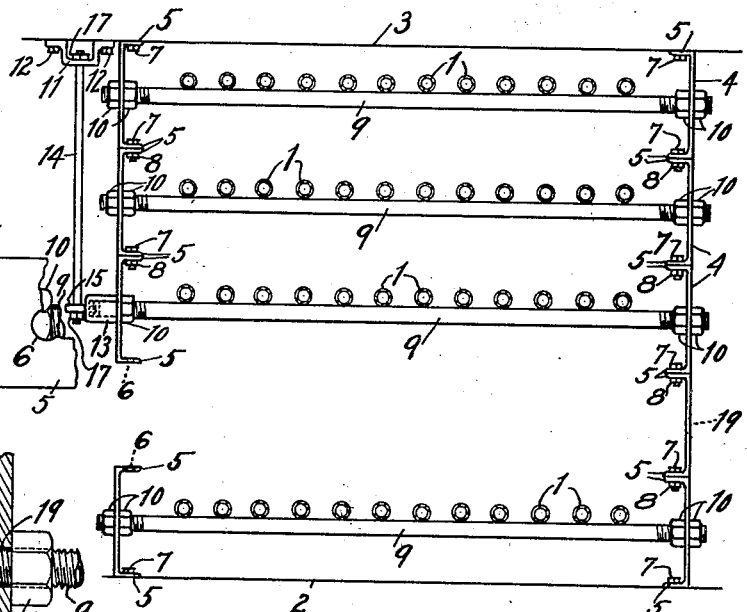
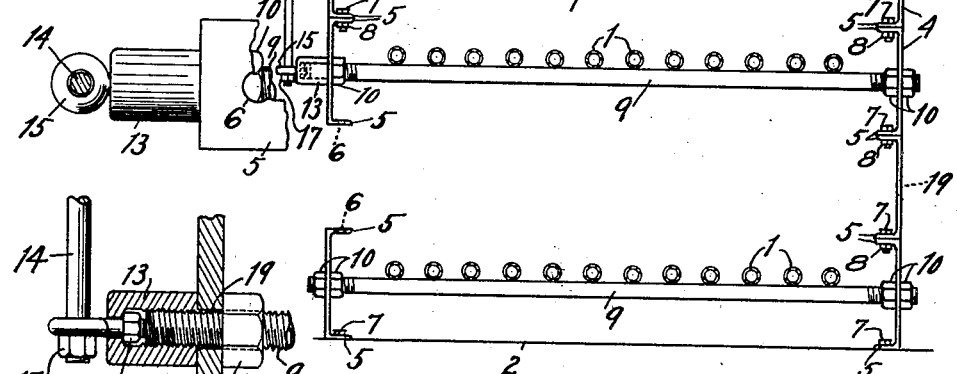
WITNESS:
INVENTOR.
Thomas J. Morris,
BY
Frank A. Cutter
ATTORNEY.

UNITED STATES PATENT OFFICE.

THOMAS J. MORRIS, OF SPRINGFIELD, MASSACHUSETTS.

SECTIONAL SUPPORT.

1,312,861.      Specification of Letters Patent.      Patented Aug. 12, 1919.

Application filed February 6, 1919. Serial No. 275,282.

*To all whom it may concern:*

Be it known that I, THOMAS J. MORRIS, a citizen of the United States of America, and a resident of Springfield, in the county of Hampden and State of Massachusetts, have invented a new and useful Sectional Support, of which the following is a specification.

My invention relates to racks, stands, or supports for pipes or other objects, and consists of separable upright and horizontal members of peculiar construction and arrangement, together with means for the temporary support of any of the intermediate horizontal sections, all as hereinafter set forth.

This support, although by no means limited to such use, is particularly well adapted for flake rooms in refrigerating plants for fish, and the primary object of the invention is to provide a support or rack for brine pipes, or other elements of a more or less similar nature, which is made in sections and so constructed that any horizontal section which carries a set of pipes, or other elements or objects, can be disconnected and detached, in order to permit such pipes or objects to be removed for the purpose of repair, replacement, etc., without disturbing other parts of the structure.

The racks for the brine pipes, in flake rooms of fish refrigerating plants, are as a rule arranged lengthwise of such a room, against the opposite side walls, and with an aisle between, and such racks have heretofore consisted in part of rows of pairs of uprights extending from floor to ceiling, each upright in each pair being made in one piece. In order, therefore, to remove any of the brine pipes which may need to be repaired or replaced, from these racks, it is necessary to take down by far the larger portion of the rack which supports such pipes. This is a laborious and expensive procedure which is practically eliminated by my invention. A great saving in time, labor, and expense is thus effected by the use of my racks or supports.

Incidentally it may be observed that generally the uprights in each pair are about four feet and six inches apart, the pairs of uprights in a row some eight to nine feet apart, and the horizontal supporting members, upon which the brine pipes rest directly, ten to eleven inches apart.

Another object is to provide means for supporting any transversely intermediate portion of the rack and the pipes carried thereby, while one or more horizontal sections or tiers below the supported portion are removed and replaced.

A further object is to produce a sectional support, of the type set forth above, which is comparatively inexpensive in construction, simple, strong and durable, and withal entirely practicable and highly efficient.

Other objects and advantages will appear in the course of the following description.

I attain the objects and secure the advantages of my invention by the means illustrated in the accompanying drawings, in which—

Figure 2:
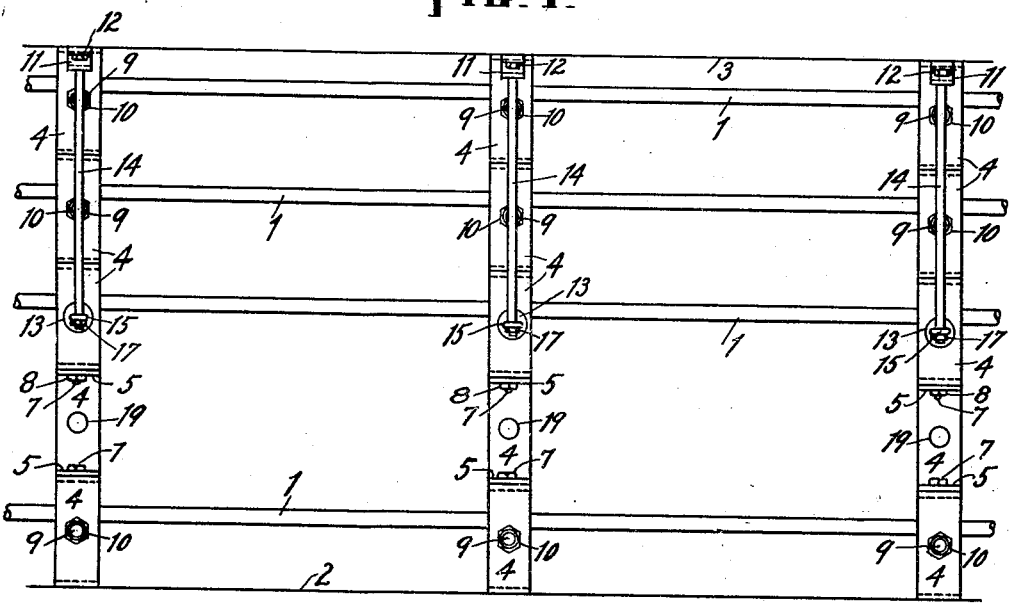

Figure 1 is a front elevation of three vertical sections of a support or rack which embodies a practical form of my invention; Fig. 2, a similar elevation, but showing the rack as it appears when a horizontal section is removed, that is to say, when a front section, with the transverse member carried at one end thereby, is detached and taken from each of said vertical sections, the front sections that are removed being taken from the same elevation, and the application of the temporary support is also illustrated in this view; Fig. 3, an end elevation of the parts shown in Fig. 1; Fig. 4, an end elevation of the parts shown in Fig. 2; Fig. 5, an enlarged top plan of connected parts of said temporary support and rack, and, Fig. 6, an enlarged detail of said parts, partly in elevation and partly in section.

Similar characters of reference designate similar parts throughout the several views.

I have necessarily shown the vertical sections, of so much of the rack as appears in the firt two views, much closer together than they ordinarily would be actually, and have embodied in the rack only five horizontal sections or tiers as being sufficient for illustrative and descriptive purposes.

A plurality of brine pipes 1 is represented in each tier of the rack, except in Figs. 2 and 4 from which one tier has been removed. These pipes are broken off at both ends in the views where they appear.

A floor is indicated or represented by a line 2, and a ceiling by a line 3, in the first four views.

Each vertical section of the rack consists of front and back uprights connected by transverse members, and each horizontal section consists of a row of these transverse members and their supporting parts in said uprights. The uprights, both front and back, consist of separable sections. Although the back uprights might each consist of a single member, as formerly, inasmuch as they seldom need to be taken apart at any point, I prefer to make them of sections like the front uprights, so that they can be taken apart should occasion require, and the general flexibility, so to speak, of the rack as a whole is greatly enhanced thereby. Each upright, therefore, comprises a plurality of superimposed flanged sections 4 rigidly and securely fastened together and to the floor 2 and the ceiling 3.

Each section 4 has top and bottom flanges 5 which are perforated, as at 6, to receive bolts 7. The flanges 5 at the bases of the bottom sections 4 and the flanges 5 at the top of the uppermost sections 4 are secured by certain of the bolts 7 to the floor 2 and ceiling 3, respectively. The sections 4 are arranged with the other flanges 5 in contiguity, and these flanges are secured by the other bolts 7 and nuts 8. Thus it is seen that any intermediate section 4 can be detached, from the upright of which it forms a part, upon removing the nuts 8 and bolts 7 which hold such section in place, and that any top or bottom section can be detached, from the upright of which it forms a part, upon removing either the ceiling or floor bolt 7, and the nut and bolt which secure said last-named section to the section below or above, as the case may be. It is seldom necessary, however, to remove the top and bottom sections 4. Thus it is easy to take out any section and just as easy to replace it.

The sections 4 of the front and back uprights may be arranged with their flanges 5 directed either inwardly or outwardly, the arrangement here being such that all of said flanges are directed inwardly.

The transverse members, which carry the pipes 1, consist of rods, pipes, or cross-pieces 9. Each supporting pipe 9 has its terminals received in openings in two oppositely disposed, front and back sections 4, and is secured in place by means of two pairs of nuts 10. The pipe or cross-piece 9 is screw-threaded at the terminals to receive the nuts 10, and such nuts in each pair tightly embrace one of the sections 4, thus securely holding said cross-piece in place.

As the uprights are erected and the rack built up, the pipes 1 are placed in position, tier above tier, on their cross-pieces 9.

In the event it be desired to take out the pipes 1 in any intermediate tier, in order to repair or replace some or all of the same, the sections 4 which are in front of such tier are released, by removing the nuts 8 and bolts 7 which hold such sections in place, the cross-pieces 9 beneath such tier are released, by removing the rearmost nuts 10 from such cross-pieces, and said sections, cross-pieces, and pipes are withdrawn into the aisle in front of the rack. Before this can be done, however, it is necessary to provide temporary supporting means for the horizontal sections of the rack and the pipes 1 carried thereby, which are above the horizontal rack section and tier of pipes that it is desired to take out, except in the event it be the section and tier next below the uppermost section and tier, the ceiling bolts 7 then supporting said uppermost section and tier. No temporary supporting means would be required were the uppermost horizontal section and tier removed, because the parts below are self-supporting.

It might be possible to block up from the floor the parts above the horizontal rack section and pipe tier to be removed, but this method would be expensive and laborious, and the blocking or staging would occupy space needed for other purposes. I prefer, therefore, to provide the temporary supporting means described below.

The aforesaid means comprises a series of brackets 11 bolted at 12 to the ceiling 3, one such bracket in front of each front upright, a series of caps 13, and a series of rods 14. Each cap 13 is internally screw-threaded to fit the front end of any one of the cross-pieces 9, and said cap is provided at its front end with an eye-bolt 15. A nut 16 on the shank of the eye-bolt 15, within the closed end of the cap 13, secures said eye-bolt to said cap, as clearly shown in Fig. 6. Each rod 14 is screw-threaded at the terminals to receive two nuts 17. The rods 14 are provided in sets of different lengths to correspond with the heights of the horizontal rack sections to be supported.

Assuming now, for example, that it be desired to remove the horizontal rack section and pipe tier that are next above the bottom horizontal section and tier, it is first necessary to remove the foremost nuts 10 on the cross-pieces 9 which constitute parts of said first-named section, and to replace said nuts with the caps 13. Then, having selected the necessary number of the rods 14 of the required length, the upper ends of said rods are thrust through openings in the brackets 11, one such opening being indicated at 18 in Fig. 3, the lower ends of said rods are inserted in the eyes of the eye-bolts 15, and the nuts 17 are applied to said rods at both ends and tightened. The horizontal rack section and pipe tier in question can now be unfastened or unbolted and removed in the manner previously explained, and this is done. The horizontal rack sections and pipe tiers above those removed are supported by the rods 14 and connected members and by the ceiling bolts 7 until the parts that were removed or duplicate parts have been replaced and secured, when the rods 14 and caps 13 are disconnected and detached, the latter being replaced by the nuts 10 that were previously taken off.

In a similar manner the middle horizontal rack section and pipe tier can be removed and replaced. Likewise other intermediate horizontal rack sections and tiers can be removed and replaced, in case a rack has more than five such sections and tiers.

It is not necessary to disturb the rear uprights during the operation of taking out and replacing a horizontal rack section and pipe tier, so no additional support is needed for the same. It will be understood, consequently, that any horizontal rack section which is removed does not include the back member 4 of such section, although in the complete rack said member, as well as the companion front member 4, enters into the construction and forms part of any given horizontal section.

When the parts, of which special mention has been made and as shown in Figs. 2 and 4 are removed, the bottom tier of pipes 1 is accessible and such pipes can be lifted out of the rack and replaced without difficulty.

Some of the openings in the sections 4 for the cross-pieces 9 appear at 19.

The members 4 may in many cases be economically made by cutting channel-irons into sections of the required width.

Although I have illustrated and described a support that is designed more especially for use in a refrigerating plant for fish, it is not, as I have hereinbefore stated, limited to such use.

It is quite evident that various changes in the shape, size, arrangement, and construction of some or all of the parts and members of my support, to adapt the same to the different uses for which it is or may be adapted, may be made without departing from the spirit of the invention.

What I claim as my invention, and desire to secure by Letters Patent, is—

1. A sectional support comprising front and back uprights adapted to be secured to the floor and ceiling, the front uprights consisting of superimposed thin flat sections having top and bottom flanges together with detachable means to secure contiguous flanges to each other, cross-pieces extending through said front and back uprights, and means to render such cross-pieces detachable, such means being attached to the cross-pieces in front of and behind said uprights.

2. A sectional support comprising front and back uprights adapted to be secured to the floor and ceiling, said front and back uprights consisting of superimposed thin flat sections having top and bottom flanges together with detachable means to secure contiguous flanges to each other, cross-pieces extending through said front and back uprights, and means to render such cross-pieces detachable, such means being attached to the cross-pieces in front of and behind said uprights.

3. The combination, in a sectional support, with a rack consisting in part of front uprights made up of thin flat sections having top and bottom flanges, together with detachable means to secure contiguous flanges to each other, and separable cross-pieces extending through said uprights, of means to afford temporary support to portions of said rack above any portion thereof which may be removed.

4. The combination, in a sectional support, with a rack consisting in part of front uprights made up of separable sections, and cross-pieces extending through said sections, of means for temporarily engaging the protruding ends of said cross-pieces and assisting in supporting the same and said sections from the ceiling.

5. The combination, in a sectional support, with a rack consisting in part of front uprights made up of separable sections, and cross-pieces extending through said sections, of ceiling brackets in front of said uprights, caps adapted to fit the protruding terminals of said cross-pieces, rods supported from said brackets, and means to connect said rods with said caps, whereby said cross-pieces and sections may be temporarily supported from said brackets.

6. The combination, in a sectional support, with a rack consisting in part of front uprights made up of separable sections, and cross-pieces extending through said sections, of ceiling brackets in front of said uprights, caps having perforated members at one end and adapted to fit on to the protruding terminals of said cross-pieces, and rods and nuts adapted to engage said brackets and perforated members, for temporary supporting purposes.

THOMAS J. MORRIS.

Witnesses:
F. A. CUTTER,
ARTHUR A. BETH.

Copies of this patent may be obtained for five cents each, by addressing the "Commissioner of Patents, Washington, D. C."